US006846138B1

(12) United States Patent
Phillips et al.

(10) Patent No.: US 6,846,138 B1
(45) Date of Patent: Jan. 25, 2005

(54) OFFSET BASE ROUTER

(75) Inventors: Alan Phillips, Jackson, TN (US); John W. Schnell, Jackson, TN (US)

(73) Assignee: Porter-Cable Corporation, Jackson, TN (US)

( * ) Notice: Subject to any disclaimer, the term of this patent is extended or adjusted under 35 U.S.C. 154(b) by 143 days.

(21) Appl. No.: 10/361,544

(22) Filed: Feb. 10, 2003

Related U.S. Application Data

(60) Provisional application No. 60/416,071, filed on Oct. 4, 2002, and provisional application No. 60/398,340, filed on Jul. 23, 2002.

(51) Int. Cl.[7] .................................................. B23C 1/20

(52) U.S. Cl. ........................ 409/182; 409/180; 409/137; 409/215; 144/136.95

(58) Field of Search ................................ 409/180–182, 409/175, 215, 137; 144/136.95, 154.5; 30/373, 374, 377

(56) References Cited

U.S. PATENT DOCUMENTS 1,361,377 A * 12/1920 Forster .................. 144/136.95
2,952,281 A * 9/1960 Weber .................... 144/136.95
3,494,395 A 2/1970 Graham
3,893,372 A * 7/1975 Strakeljahn ................. 409/180
4,187,046 A * 2/1980 Atherton ...................... 409/180
4,239,428 A * 12/1980 Berzina ....................... 409/182
4,461,330 A * 7/1984 Judkins ................... 144/154.5
5,013,196 A * 5/1991 Friegang ...................... 409/182
5,865,230 A * 2/1999 Smith et al. ........... 144/136.95
5,988,240 A * 11/1999 Markus ................. 144/136.95
6,042,311 A * 3/2000 Yokoyama et al. ......... 409/182
6,048,260 A * 4/2000 Kopras ....................... 409/182
6,260,591 B1 * 7/2001 George et al. ......... 144/136.95
6,368,033 B2 4/2002 Souders
6,449,852 B1 * 9/2002 Simantel ...................... 30/373

FOREIGN PATENT DOCUMENTS

DE 3107397 A1 * 11/1982

* cited by examiner

*Primary Examiner*—Erica Cadugan
(74) *Attorney, Agent, or Firm*—Suiter West PC LLO

(57) ABSTRACT

An offset base router includes an offset base assembly comprising a base coupled with a sub-base which provides an offset center of gravity and an aperture through which a bit may access a work piece. Additionally, the base and sub-base allow a dust collection system to be attached through them. The offset base router further includes a motor assembly comprising a motor casing which houses a motor. The motor assembly connects with a gear assembly comprising an inner gear casing which is housed in an outer gear casing that includes a grip. The inner gear casing houses an arbor assembly that connects with the bit and the motor. A height adjustment assembly coupled with the offset base assembly and the inner gear casing allows a user to adjust the height of the inner gear casing relative to the base and the sub-base.

52 Claims, 12 Drawing Sheets

OFFSET BASE ROUTER

CROSS REFERENCE TO RELATED APPLICATIONS

The present application claims priority under 35 U.S.C. § 119(e) to U.S. Provisional Application 60/398,340 filed Jul. 23, 2002, and to U.S. Provisional Application 60/416,071 filed Oct. 4, 2002. Provisional Application 60/398,340 and 60/416,071 are herein incorporated by reference in their entirety.

FIELD OF THE INVENTION

The present invention generally relates to the field of power tools, and particularly to an offset base router.

BACKGROUND OF THE INVENTION

Woodworkers employ offset base routers to accomplish a variety of tasks. From simple cornering to elaborate ornamental designs, offset base routers provide an effective tool for the job.

Unfortunately, typical offset base router design aligns the center of gravity directly over the cutting tool (bit) being used by the offset base router and places the center of gravity above the bit. This may result in an unstable offset base router. Thus, when working on corners or other edges, a user must continuously exert force to keep the offset base router from falling off the precipice being worked on. This may result in decreased work quality and increased production time due to user fatigue. Additionally, many offset base routers are limited to a single cutting tool size and the ability to attach only one template guide. Further, current offset base router design may prove restrictive in efforts to work on surfaces abutted by another perpendicular surface, corners, or other space limited areas.

Current offset base routers employ a variety of configurations for providing greater access to perpendicular surfaces. Other offset base router designs relocate the center of gravity. And still other offset base router designs provide for the attachment of template guides and multiple cutting tool sizes. Thus, a user may be forced to purchase several separate offset base router devices to accommodate a variety of user needs.

Therefore, it would be desirable to provide an offset base router with an offset center of gravity located behind the cutting tool and with the ability to attach multiple cutting tools and template guides, which is designed to allow access of the offset base router to corners and other space limited areas.

SUMMARY OF THE INVENTION

Accordingly, the present invention is directed to an offset base router with a center of gravity located behind a cutting tool, balanced so as not to require user force to maintain its position, capable of attaching multiple template guides, and providing multiple apertures for use with a variety of cutting tools. In a first aspect of the present invention, an offset base router includes a motor assembly coupled to a gear assembly. The gear assembly is further coupled to an offset base assembly. The gear assembly houses an arbor assembly capable of connecting a bit and translating the horizontal drive force provided by the motor assembly into a vertical drive force. The offset base mechanism provides access by the bit to a work piece and a center of gravity proximally located about the coupling point of the motor assembly to the gear assembly.

In an additional aspect of the present invention, an offset base router includes a motor assembly coupled to a gear assembly. The gear assembly is further coupled to an offset base assembly. The gear assembly houses an arbor assembly capable of connecting a bit and translating the horizontal drive force provided by the motor assembly into a vertical drive force. The offset base router further includes a height adjustment assembly coupled to the offset base assembly and the gear assembly for providing vertical adjustment capabilities. Wherein the height adjustment assembly enables the adjustment of the height of the gear assembly relative to the offset base assembly.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1A:
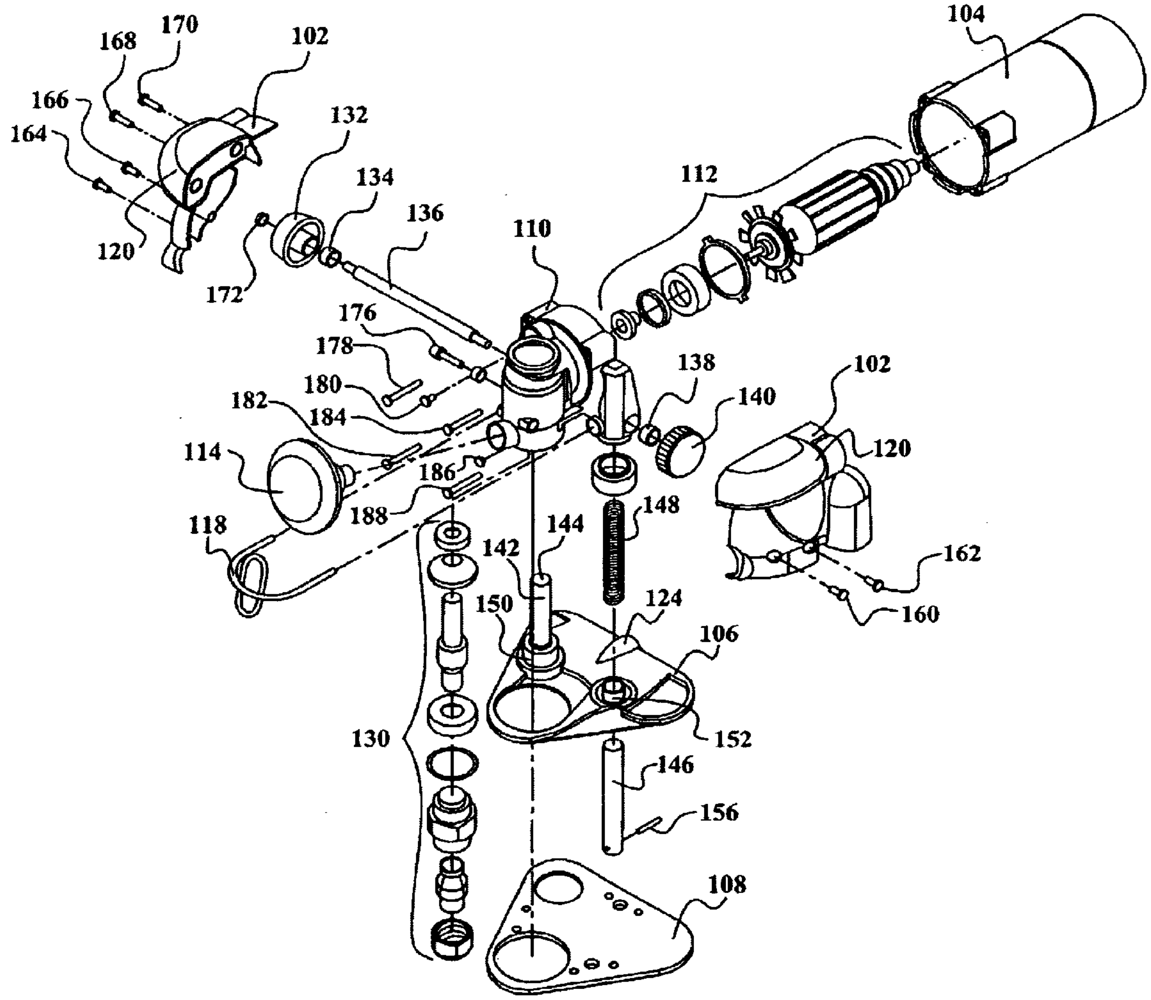
FIG. 1A is an exploded view of an offset base router in accordance with an exemplary embodiment of the present invention.
Figure 1B:
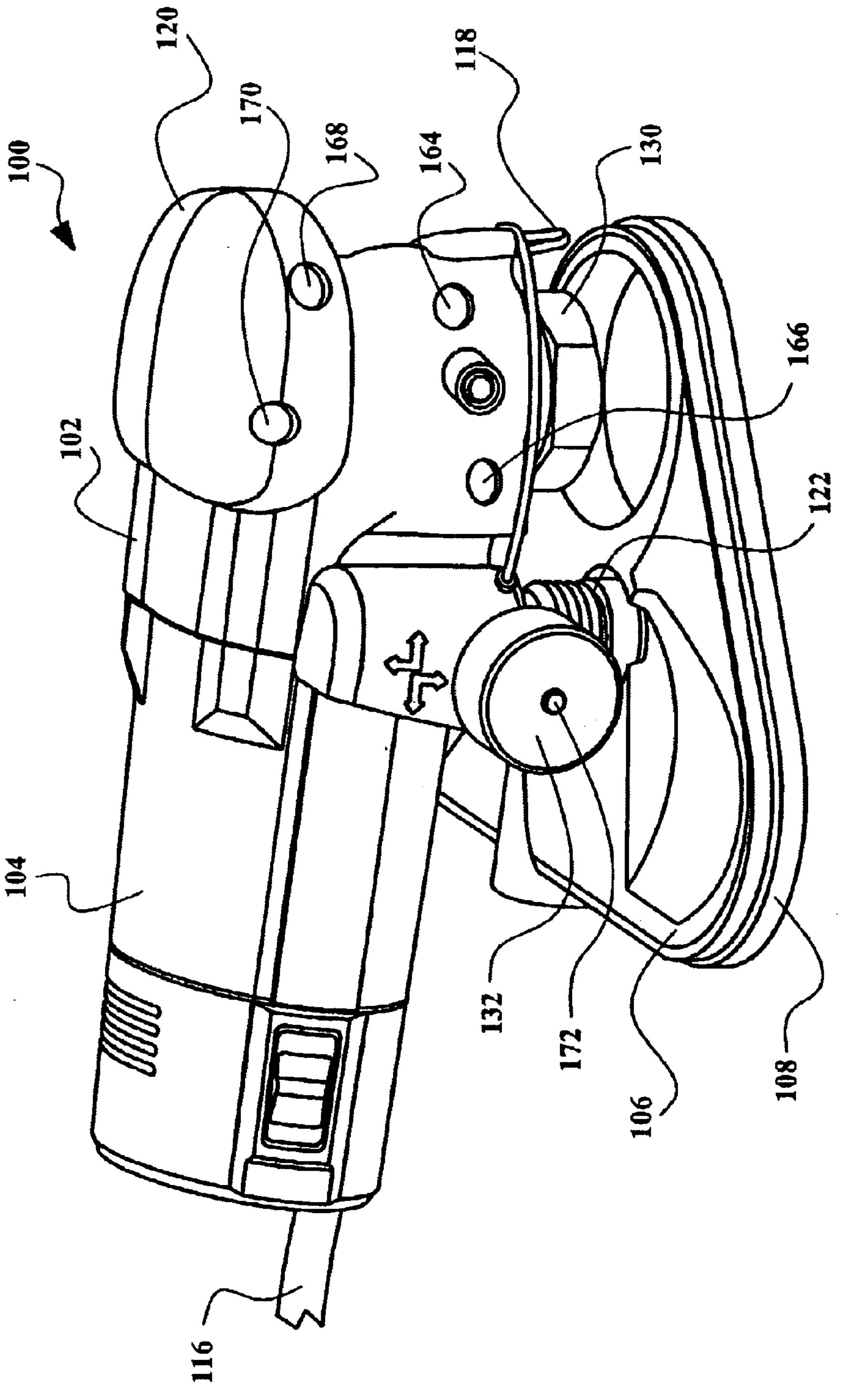
FIG. 1B is an isometric view illustrating the offset base router in accordance with an exemplary embodiment of the present invention.

Reference will now be made in detail to the presently preferred embodiments of the invention, examples of which are illustrated in the accompanying drawings. By providing an offset center of gravity, an offset base router becomes a balanced device. This balance may decrease the force required for operation enabling more precise and repetitive work. Further, such a balanced device may decrease damage done to the offset base router as a result of careless use. Another advantage of the present invention is a height adjustment assembly which provides a locking mechanism that engages a pinion upon two rack posts. This provides increased stability and fewer instances in which a user may overcome the locking mechanism resulting in a loss of position and irregular work production.

Referring generally now to FIGS. 1 through 11, an offset base router 100 in accordance with the present invention, is shown. FIG. 1A illustrates the offset base router 100 in an exploded view. In the current embodiment, the offset base router 100 includes a gear assembly comprising an outer gear casing 102 which partially encompasses an inner gear casing 110. The offset base router 100 further includes a motor assembly comprising a motor casing 104 partially encompassing a motor 112. The configuration of the gear assembly and the motor assembly is exemplary and may vary as contemplated by one of ordinary skill in the art. In the preferred embodiment, the motor casing 104 and the motor 112 couple with the inner gear casing 110. Alternatively, the motor casing 104 may couple with the outer gear casing 102 or the motor casing may not couple with either the outer gear casing 102 or the inner gear casing 110. The inner gear casing 110 couples with an offset base assembly comprised of a base 106 and a sub-base 108. Additionally, an arbor assembly 130 is coupled through the inner gear casing 110 with the motor 112. The arbor assembly 130 is suitable for holding a cutting tool or bit in place for use by the offset base router 100.

The arbor assembly 130 is provided in a substantially vertical axis through the inner gear casing 110. The motor 112 and the motor casing 104 are oriented in a substantially horizontal axis relative to the substantially vertical axis of the arbor assembly 130 and the inner gear casing 110. Thus, in the preferred embodiment, the motor 112 and the motor casing 104 are connected at a ninety degree angle relative to the inner gear casing 110 and the arbor assembly 130. However, it is understood that the angle at which the motor casing 104 and the motor 112 are coupled to the inner gear casing 110 and the arbor assembly 130 may vary as contemplated by one of ordinary skill in the art without departing from the scope and spirit of the present invention. For instance, the substantially horizontal axis of the motor casing 104 and the motor 112 may be at an eighty eight degree angle relative to the substantially vertical axis of the inner gear casing 110 and the arbor assembly 130.

A removable handle 114, shown in FIGS. 1A, 1C through 6, and 9 through 11, couples with the inner gear casing 110 on the opposite side of the coupling of the inner gear casing 110 with the motor 112 and the motor housing 104. The outer gear casing 102 further includes a grip 120 formed to be used by an operator of the offset base router 100 when the removable handle 114 is not present, as shown in FIG. 1B. It is understood that the design of the grip 120 may be altered to meet the needs of a consumer or a manufacturer without departing from the scope and spirit of the present invention.

The outer gear casing 102 is disposed with the grip 120 and to the inner gear casing 110 through the use of fasteners 160, 162, 164, 166, 168, and 170. Preferably, the fasteners 160 through 170 are pins which are sized to fit in the designated spaces of the outer gear casing 102, the grip 120, and the inner gear casing 110. The coupling of the arbor assembly 130 through the inner gear casing 110 to the motor assembly is held in place by fasteners 176, 178, 180, 182, 184, 186, and 188. In the present embodiment the fasteners 176 through 188 are pins which are sized to fit in the designated spaces in the inner gear casing 110 and engage with the arbor assembly 130 and the motor 112. It is understood that the fasteners 160 through 170 and 176 through 188 may take a variety of forms, such as screws, bolts, and the like.

A height adjustment assembly couples an offset base assembly with the inner gear casing 110 of the offset base router 100. The offset base assembly includes a base 106 coupled with a sub-base 108. In the current embodiment the offset base assembly is composed of metal, such as steel. However, the base 106 and the sub-base 108 may be comprised of a clear material, such as plastic, to allow improved visibility of a work surface by the user of the offset base router. Other composite materials, as contemplated by one of ordinary skill in the art, may be employed to construct the base 106 and the sub-base 108 without departing from the scope and spirit of the present invention. In the current embodiment, the base 106 is disposed with a first mounting assembly 150 and a second mounting assembly 152.

In the current embodiment, the height adjustment assembly includes a first hollow rack post 142 and a second hollow rack post 146. Disposed inside of the first hollow rack post 142 is a first compression spring 144 and inside of the second hollow rack post 146 is a second compression spring 148. The first and second compression spring may alternately be a constant tension spring, and the like, as contemplated by one of ordinary skill in the art. A first bellow 122 partially encompasses the first hollow rack post 142 and a second bellow 128 partially encompasses the second hollow rack post 146. As shown, a first end of the second hollow rack post 146 is fastened to the second mounting assembly 152 on the base 106 by use of a fastener 156. It is understood that a first end of the first hollow rack post 142 is fastened to the first mounting assembly 150 on the base 106 by the similar use of a fastener. The fasteners employed to hold the first and second hollow rack posts in place may be pins, screws, bolts, or the like. In an alternative embodiment, the first and second hollow rack posts may extend through the base 106 and couple with the sub-base 108.

The height adjusting system further includes a pinion 136 engaged on a first end by a first clamp spacer 134, a height adjustment knob 132 and a fastener 172. The pinion 136 is engaged on a second end by a second clamp spacer 138, a lock knob 140 and a fastener 174. It is understood that the fasteners 172 and 174 may take a variety of forms, such as screws, bolts, and the like. As shown in FIG. 1A, and further shown and described in FIG. 7, the pinion extends through the inner gear casing 110 on a substantially horizontal axis. Further, it is shown that the first and second hollow rack posts 142 and 146, including the first and second compression springs 144 and 148, extend through blind holes into the inner gear casing 110 in a substantially vertical orientation. The pinion 136 engages both the first and the second hollow rack posts 142 and 146 within the inner gear casing 110, providing a preferred rack and pinion embodiment.

The height adjustment knob 132 is attached in a fixed position relative to the pinion 136. Rotation of the height adjustment knob 132 causes the pinion 136 to rotate on its axis and moves each of the hollow rack posts 142 and 146 up or down against the force of the compression springs 144 and 148. The compression springs 144 and 148 inside the hollow rack posts cause the inner gear housing 704 to be repelled away from the base 106 (i.e., fully extended).

Maximum height of the offset base router is limited when the pinion 712 reaches the end of the rack teeth (shown in FIG. 7) formed upon each of the hollow rack posts.

When the desired position is obtained the height adjustment knob 132 is held steady while the lock knob 140 is turned clockwise, causing the lock knob 140 to rotate on threads formed on the pinion 136. The rotation of the lock knob 140 causes the threaded pinion 136 (with fixed clamp space and height adjusting knob) to be drawn toward the lock knob 140. The clamp spacers have internal details that allow the pinion 136 to slide freely though them. The chamfered end of the clamp spacers cause forces to be applied against the pinion 136, the hollow rack posts 142 and 146 and the blind holes in the inner gear housing 110, causing the height adjustment assembly to be rigidly locked.

It is contemplated that the height adjustment assembly may be enabled in a variety of configurations. In one alternate embodiment, the height adjustment assembly may be comprised of a single rack post engaged with a single shaft disposed in the inner gear casing. The pinion may engage the single rack post in order to provide vertical movement capabilities. Additionally, the rack post may be a solid rack post containing no spring. In another embodiment, the height adjustment assembly may be comprised of two solid rack posts engaged with two shafts disposed in the inner gear casing. The pinion may engage both rack posts in a manner similar to that described above. It is further contemplated that the height adjustment assembly may include more than two rack posts and shafts. Alternatively, a hydraulic system and the like may be employed to provide the height adjustment assembly without departing from the scope and spirit of the present invention.

The offset base router 100 further comprises a power cord 116 which connects to the motor casing 104 and a wire guard 118, composed of at least one of a plastic and a metal, that connects to the inner gear casing 10 and partially surrounds the arbor assembly 130 to provide protection to a user of the offset base router 100. In an alternative embodiment the offset base router 100 may be powered by a pneumatic system using compressed air. In such an instance the motor assembly may engage directly with the compressed air imparting a rate of spin to the arbor assembly 130 as is performed using the motor 112. The offset base router 100 may also be powered by a hydraulic system coupled with the motor 112. Power may also be supplied through the use of a battery pack. The battery pack may be rechargeable and be a variety of sizes providing a variety of voltages. In another embodiment the offset base router 100 may be powered by fuel cells coupling to the motor 112 of the motor assembly. Other configurations for powering the offset base router 100 as contemplated by one of ordinary skill in the art may be employed without departing from the scope and spirit of the present invention.

It is contemplated that the offset base router 100 may use a variety of differently configured motor casings and motor assemblies which may connect with the inner gear casing 110 and the arbor assembly 130, providing the driving power for the arbor assembly 130. Further, the motor assemblies and the motor casings may couple with the outer gear casing 102 as well as the inner gear casing 110.

Figure 1C:
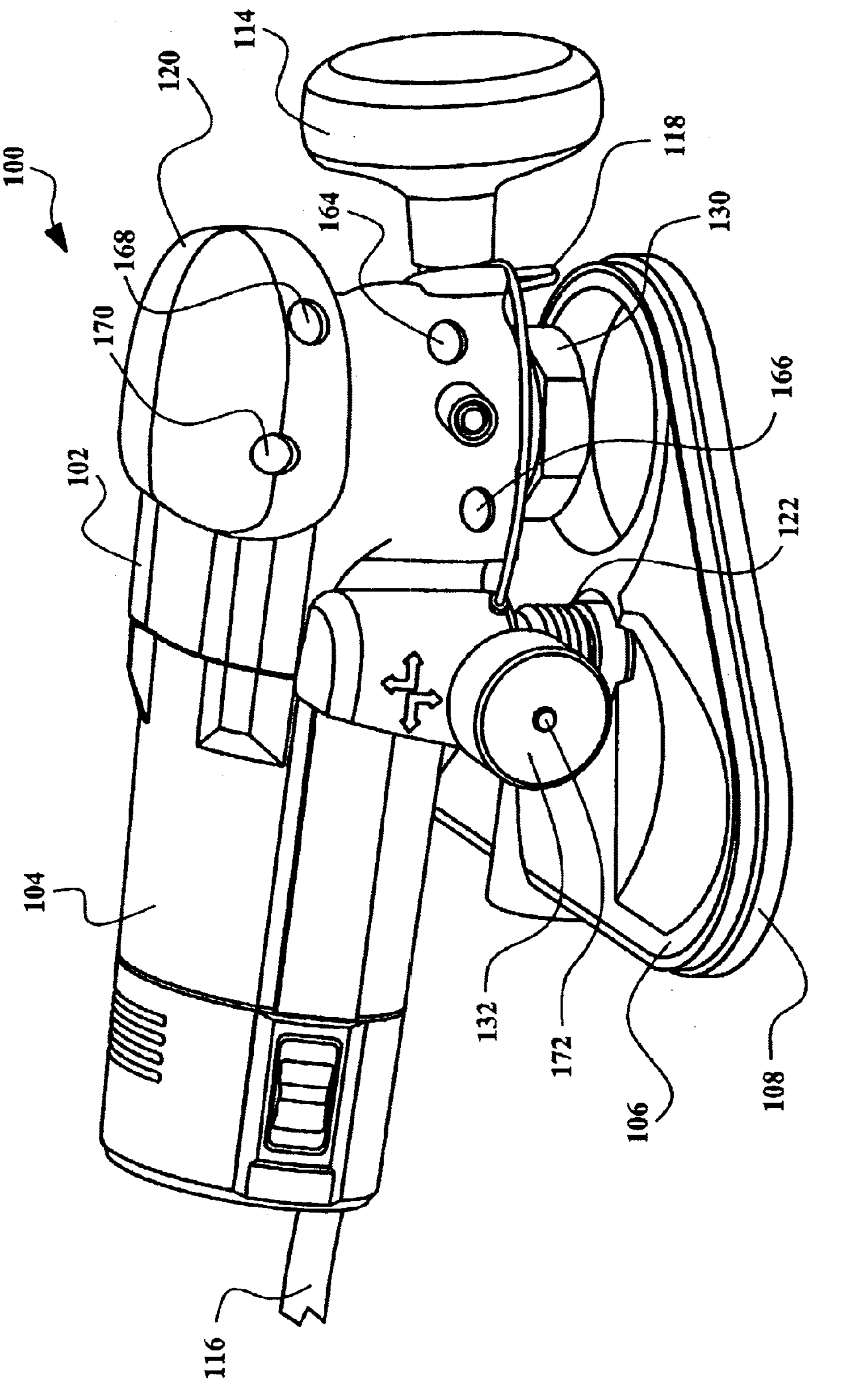
FIG. 1C is an isometric view illustrating the offset base router shown in FIG. 1A including a handle.
Figure 2:
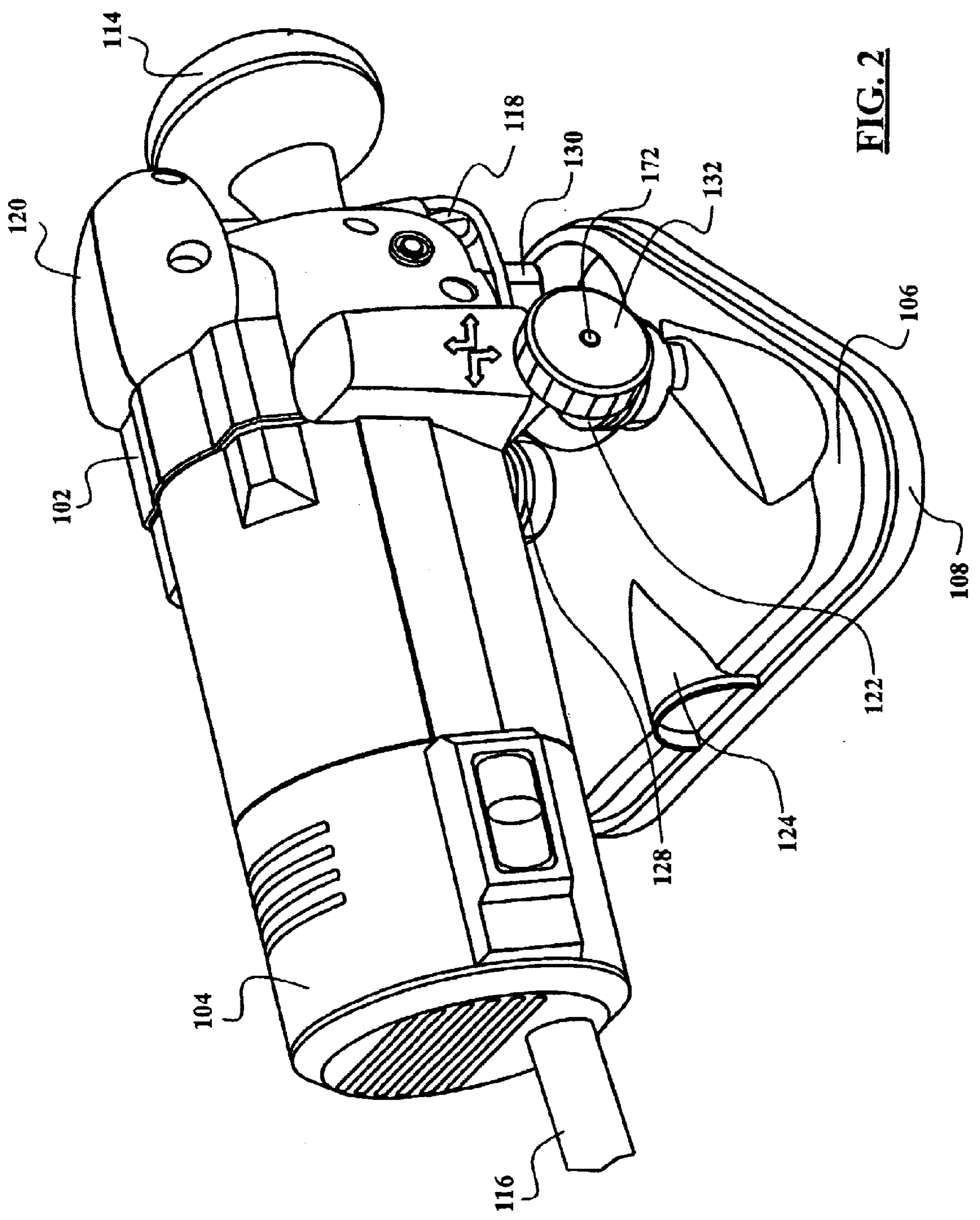
FIG. 2 is an isometric view illustrating the offset base router including a vacuum portal disposed between a base and a sub-base.
Figure 3:
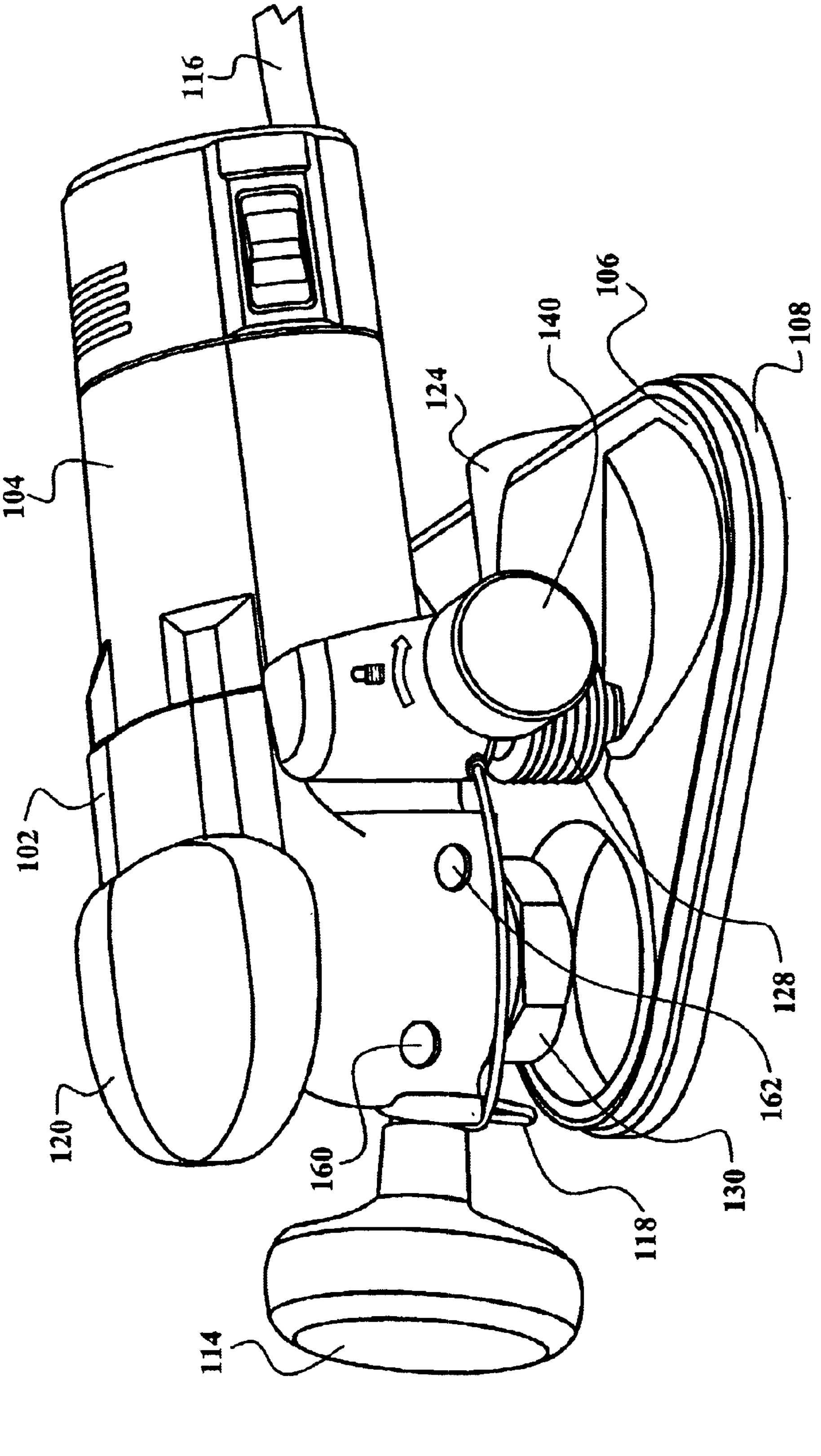
FIG. 3 is a right side elevation view illustrating the offset base router and a locking mechanism clamping knob.

In the embodiments shown in FIGS. 1A and 1C, a handle 114 is connected to the inner gear casing 110. The handle 114 is removable from the inner gear casing 110 and when the handle is not present, as illustrated in FIG. 1A, the grip 120 provides a user a stable handhold. Preferably, the handle 114 is attached to the inner gear casing 110 on the side opposite of where the motor casing 104 attaches. Alternately, the handle 114 may be enabled to attach to the inner gear casing 110 or the outer gear casing 102 in a variety of locations as may be contemplated by one of ordinary skill in the art.

The current embodiment provides a low center of gravity to the offset base router 100 and offsets the center of gravity behind the arbor assembly 130 near the attachment point of the motor 112 to the inner gear housing 110. By placing the center of gravity behind the arbor assembly 130, the offset base router 100 provides greater stability and ease of use when template or edge routing.

Figure 4:
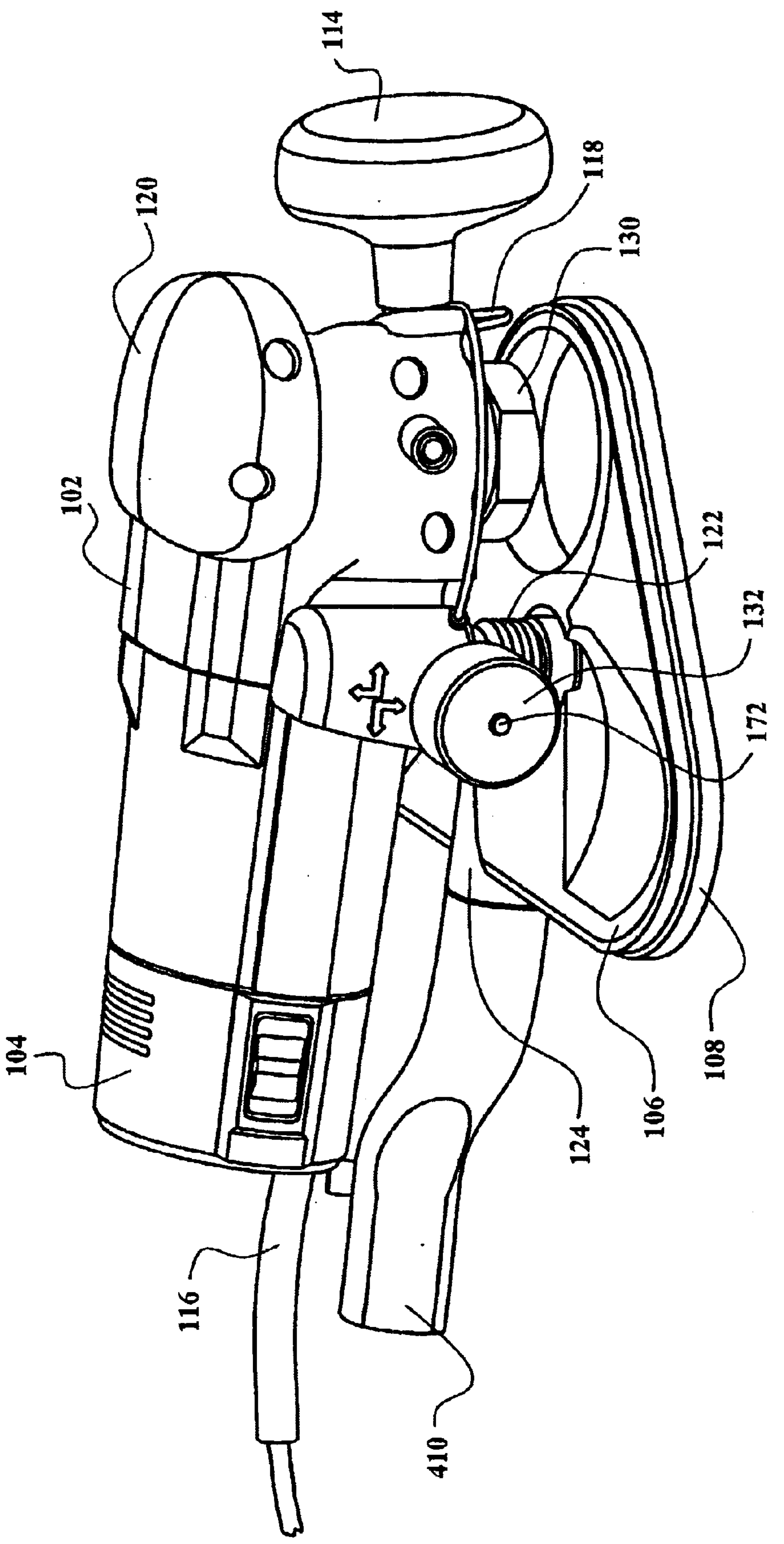
FIG. 4 is an isometric illustration of the offset base router engaged with a vacuum hose connector for dust collection in accordance with an exemplary embodiment of the present invention.
Figure 5:
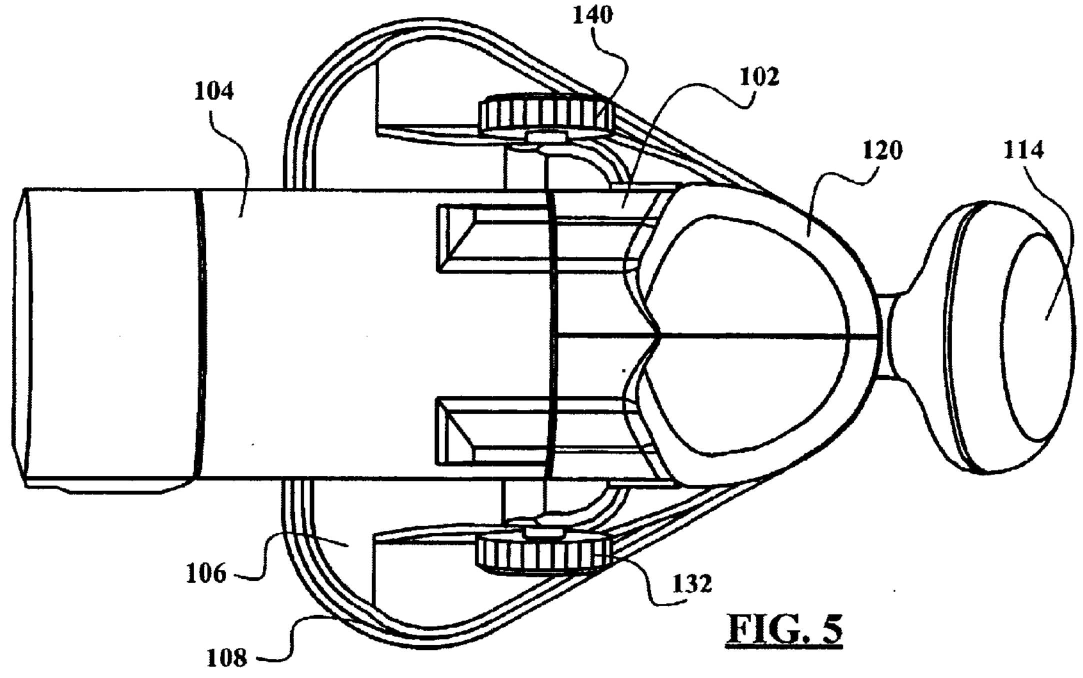
FIG. 5 is a top plan view illustrating the offset base router in accordance with an exemplary embodiment of the present invention.

In the present embodiment, a portal 124 is included between the base 106 and the sub-base 108. As shown in FIG. 4, the portal 124 enables the offset base router 100 to couple with a vacuum hose connector 410. The vacuum hose connector 410 is suitable for coupling the offset base router 100 to a dust collection system. As is shown in the exemplary embodiment of FIG. 9, the portal 124 provides access to a cavity that exists between the base 106 and the sub-base 108. The cavity extends to the aperture in the base 106 and the sub-base 108 for collecting dust and debris generated by the offset base router 100. Other configurations for dust collection, as contemplated by one or ordinary skill in the art, may be employed without departing from the scope and spirit of the present invention.

Figure 6:
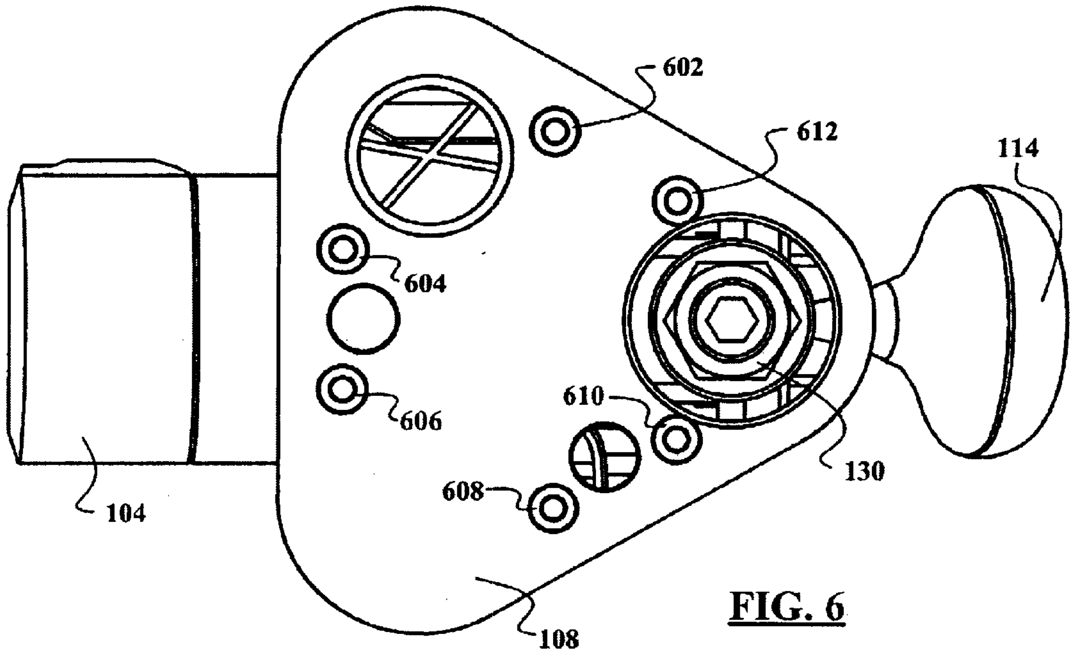
FIG. 6 is a bottom plan view illustrating a sub-base of the offset base router.

In FIG. 6, the sub-base 108 is shown to include a first aperture 615 and a second aperture. In the present embodiment the first and second apertures 615 and 620 may be used to allow a cutting tool, attached to the arbor assembly 110, access to a work piece or for the attachment of a template guide. One of the apertures may be threaded for the purpose of attaching a template guide. Alternatively, one of the apertures may provide a variety of docking mechanisms for a template guide, such as a compression docking mechanism or the like.

In the present embodiment, the coupling of the base 106 and the sub-base 108 is accomplished through the use of a plurality of screws 602, 604, 606, 608, 610, and 612. It is contemplated that the sub-base 108 may be coupled to the base 106 in such a manner that allows the sub-base 108 and the apertures to be re-positioned relative to the base 106. A fastening system employing a variety of devices, such as pins, compression snaps, screws, bolts, and the like, may be used to accomplish this. Further, the sub-base 108 may be enabled to be off-set from the base 106 and still allow the user to operate the offset base router. This may increase the number of applications capable of being performed by the present invention. For example, an offset sub-base may be configured and used as a template guide itself without having to attach a separate work piece.

Figure 7:
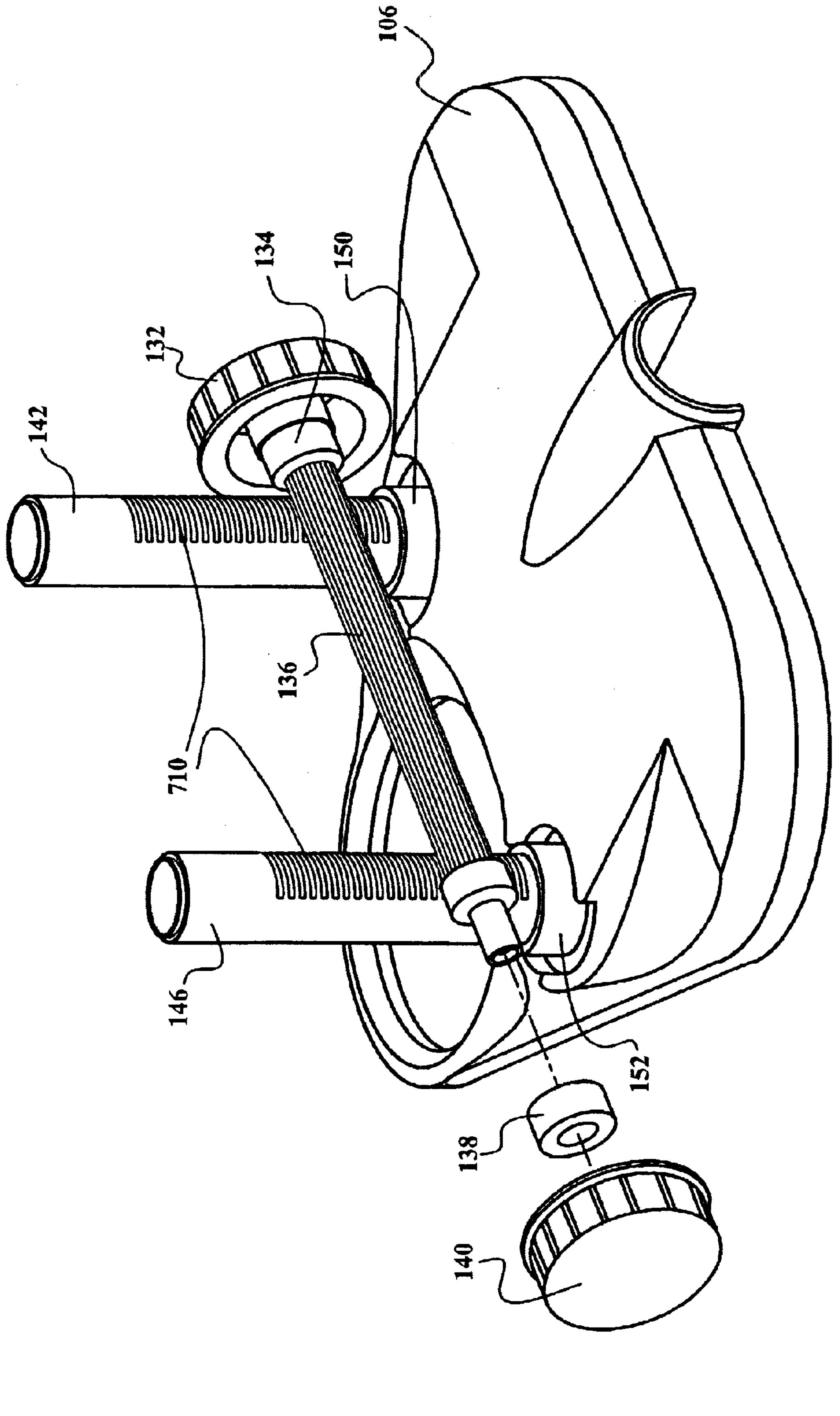
FIG. 7 is an illustration of a height adjustment assembly of the offset base router.

The component pieces for the system for adjusting the height of the inner gear casing 110 relative to the base 106 is shown in FIG. 7. Preferably, the first and second hollow rack posts 142 and 146, include rack teeth 710. As previously discussed the first and second hollow rack posts are coupled to the first and second mounting assemblies 150 and 152, respectively. The pinion 136, engages with the rack teeth 710 on both the first and the second hollow rack posts 142 and 146, couples with the first and second clamp spacers 132 and 138, the height adjustment knob 132 and the lock knob 140. The rack and pinion system provides increased ease of use and a more stable locking mechanism due to the capability of the pinion 136 being locked in place relative to both hollow rack posts.

Figure 8:
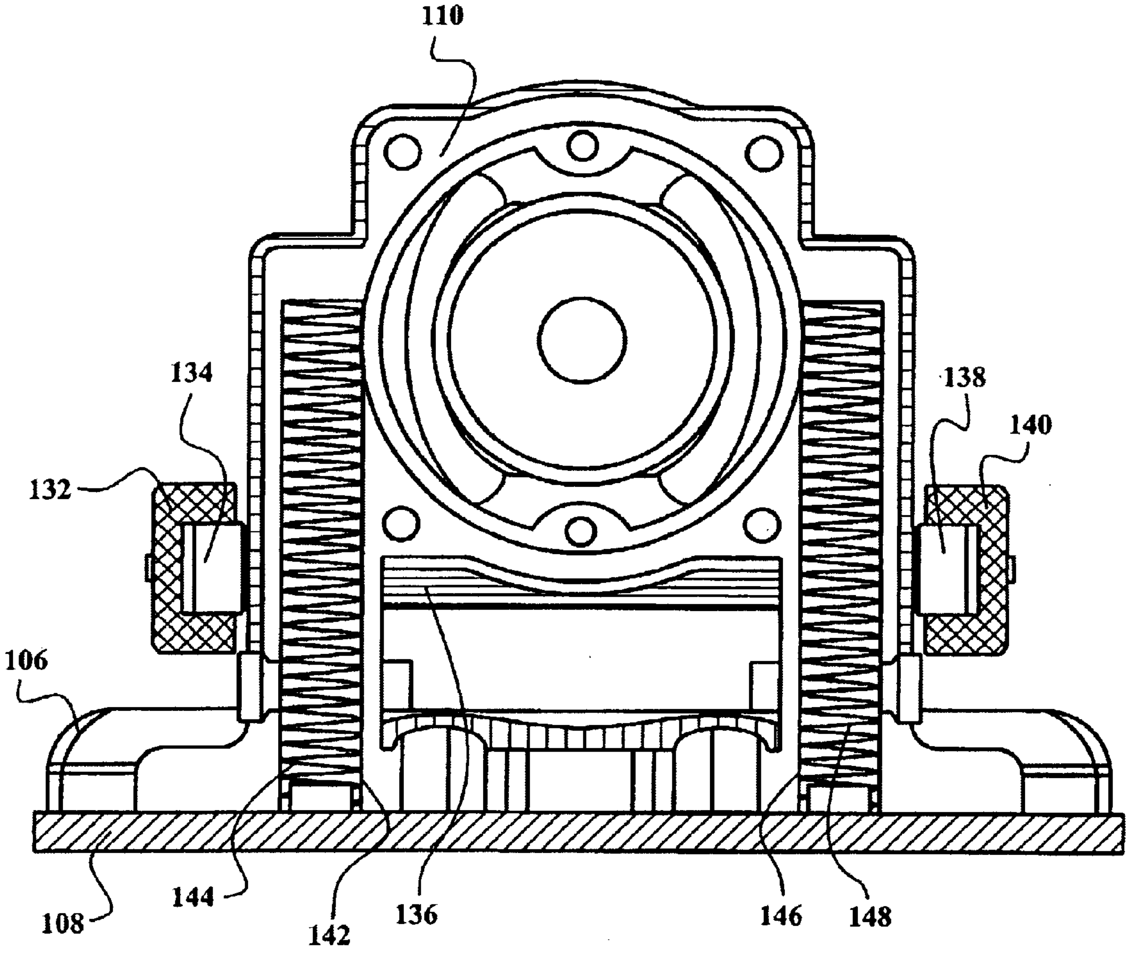
FIG. 8 is a front plan cross-sectional view illustrating the height adjustment mechanism and motor location of the offset base router.

Referring now to FIG. 8, a front cross-sectional view of the offset base router further illustrates the height adjustment assembly. The first and the second hollow rack posts 142 and 146, including the compression springs 144 and 148, are shown in connection with the base 106 and vertically disposed within the inner gear casing 110. The pinion 136 extends through the inner gear casing 110, operably engaging the hollow rack posts 142 and 146. At one end of the pinion 136, on the outside of the inner gear casing 110, the first clamp spacer 134 and the height adjustment knob 132 are connected. At the opposite end of the pinion 136, on the outside of the inner gear casing 110, the second clamp spacer 138 and the lock knob 140 are connected.

Figure 9:
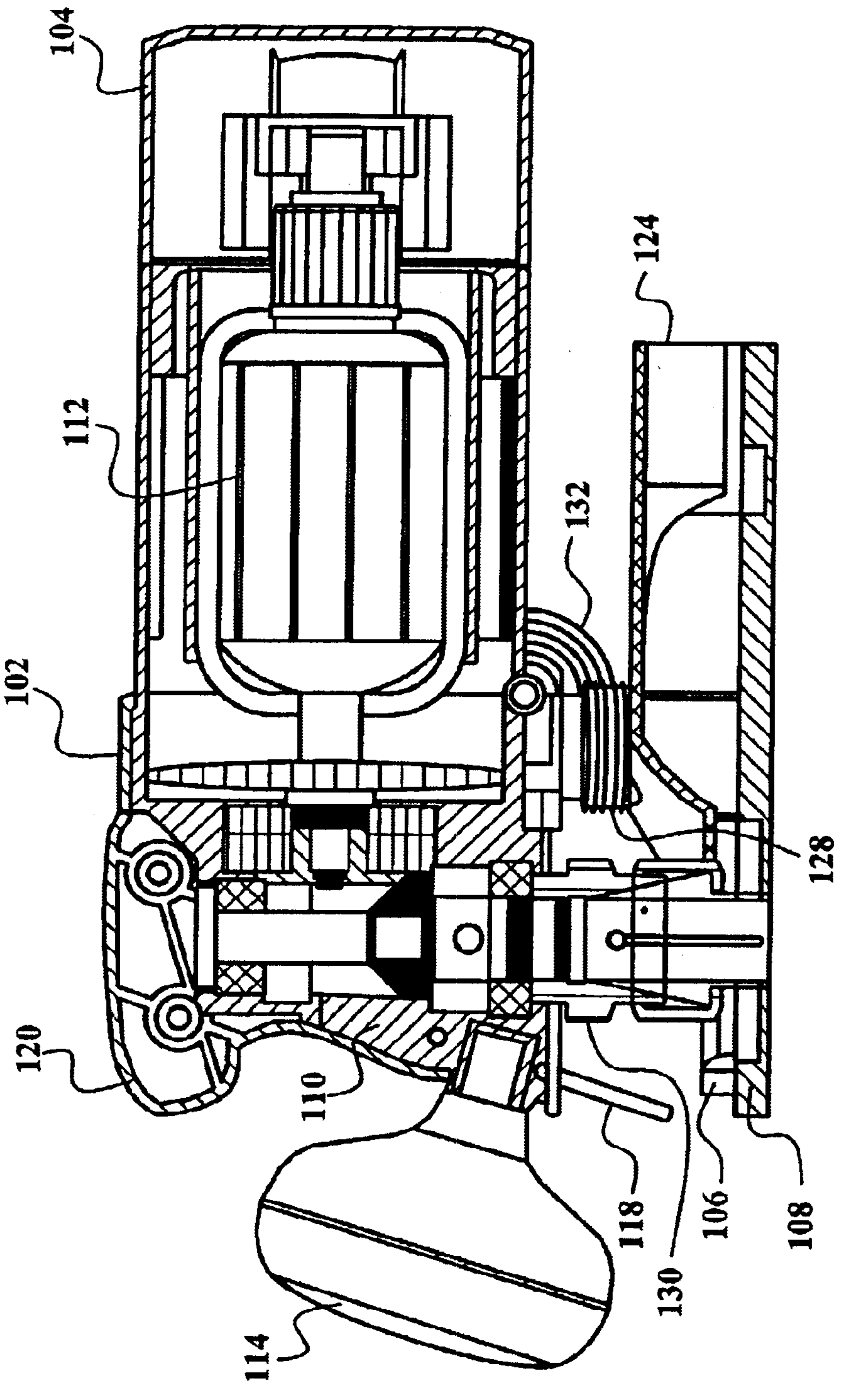
FIG. 9 is a right side cross-sectional view illustrating the offset base router in accordance with an exemplary embodiment of the present invention.

Referring now to FIG. 9, a side cross-sectional view of the offset base router is shown. The motor casing 104, which houses the motor 112, connects with the inner gear casing 110. The outer gear casing 102 encompasses the inner gear casing 110 and includes the grip 120. The arbor assembly 130, disposed within the inner gear casing 110, connects with the motor 112 at one end and connects with a bit at the other end. The arbor assembly 130 extends through base 106 and into an aperture within sub-base 108. This allows the bit access to a work piece. The portal 124 provides access to the cavity that extends between base 106 and sub-base 108. The cavity has a first opening in the area next to the bit, and the portal 124 provides the second opening at the opposite end for connection with a dust collection system, as previously discussed.

Figure 10:
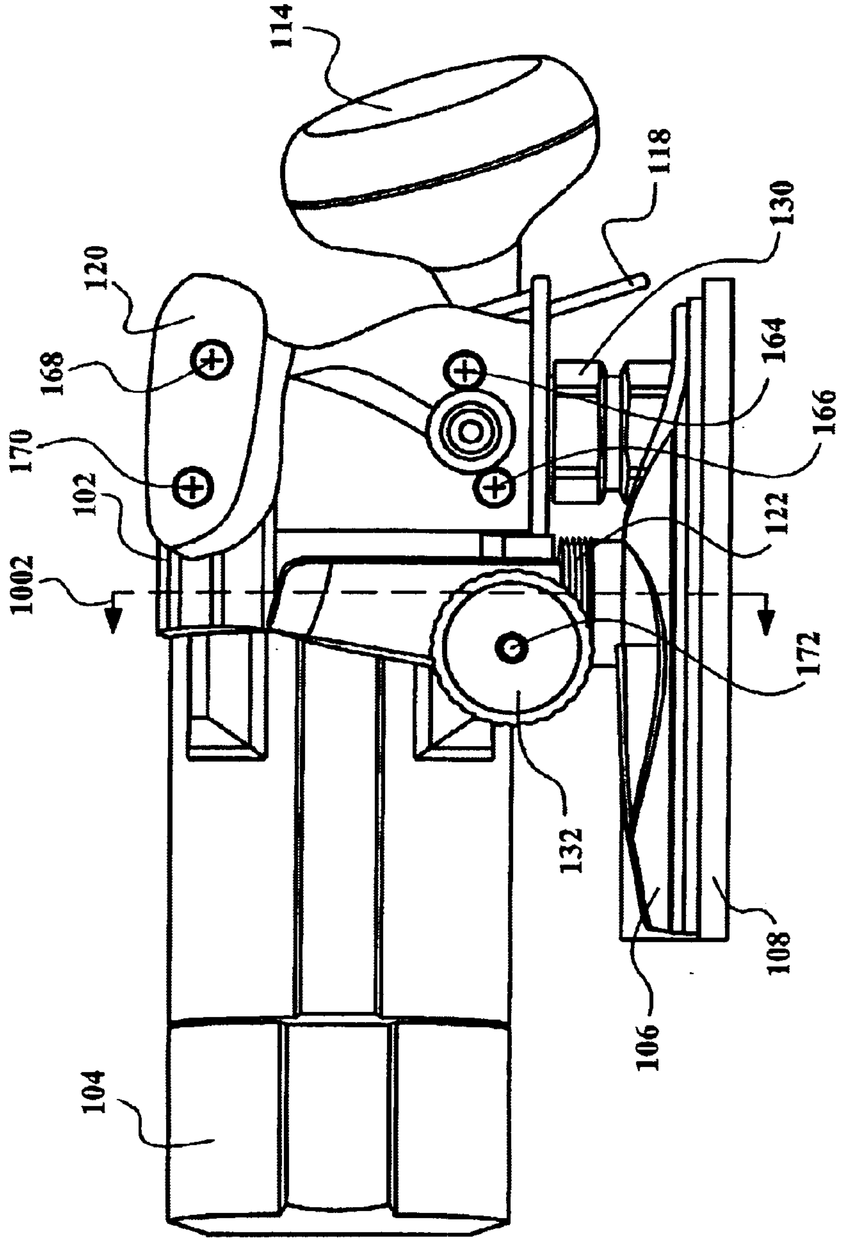
FIG. 10 is an illustration of the offset base router including an indication of the location of the offset center of gravity.
Figure 11:
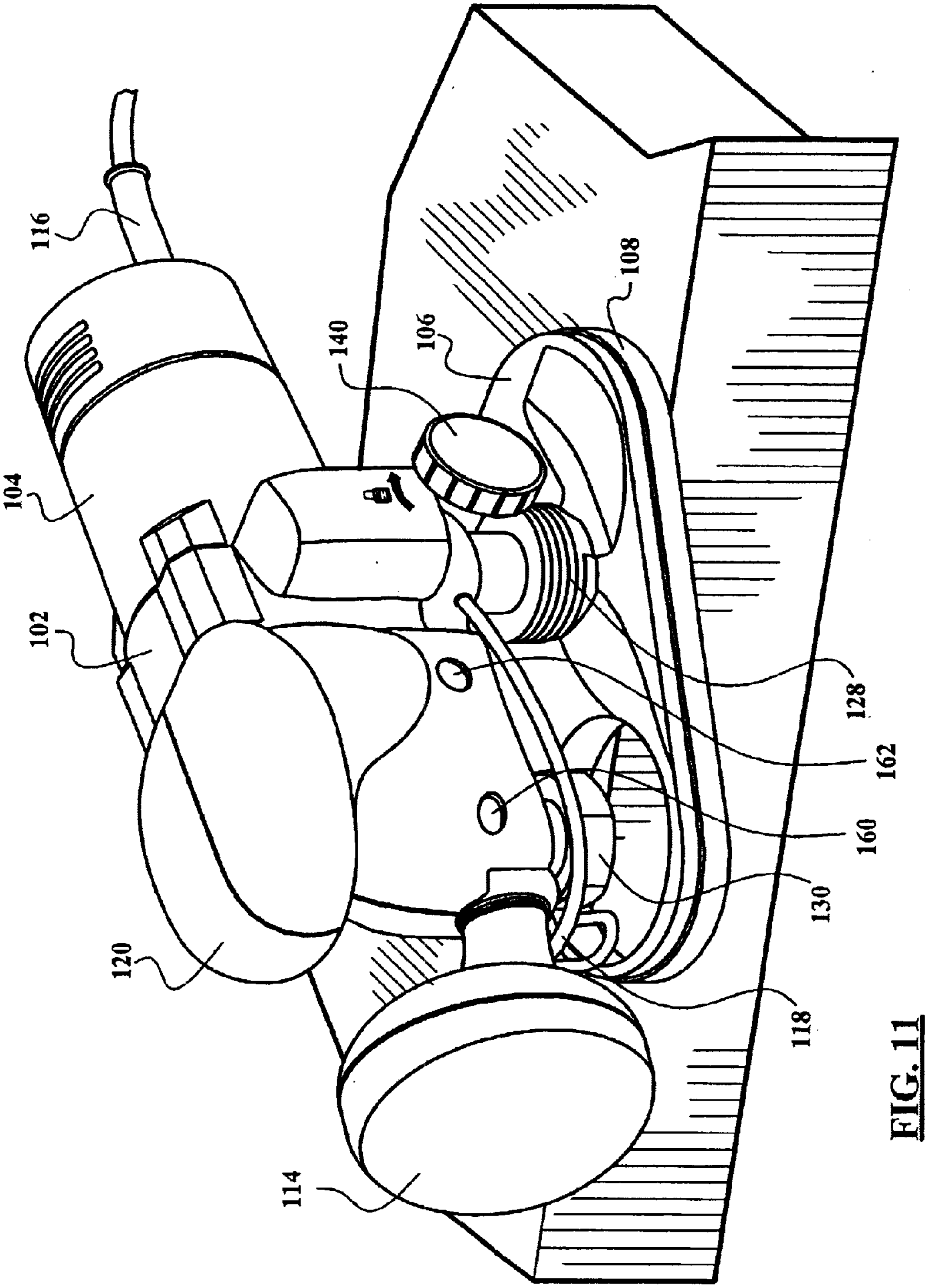
FIG. 11 is an illustration of the offset base router engaged on a work piece demonstrating the offset center of gravity and the beneficial effect this has on the operation of the offset base router upon an edge, corner, or other precipice of a work piece.

Referring now to FIGS. 10 and 11, a line 1002 representing the offset center of gravity for the offset base router and the resulting benefit is shown. By establishing the center of gravity behind the bit, the present invention may increase ease of use by an operator. The present invention may reduce the required physical force needed to maintain the offset base router in the appropriate position when operably engaged with a work piece. Further, damage to the offset base router may be reduced because the center of gravity allows the offset base router to maintain balance and position even when partially extended over a precipice, as shown in FIG. 11. In such an instance, a user of the offset base router may disengage with (let go of) the offset base router while it is positioned over an edge, and the offset base router will not fall off. Other routers, including right angle routers, have the center of gravity located in such a position that a user would not be able to place the offset base router over a precipice, as shown in FIG. 11, and have the offset base router maintain balance. Routers, which are not enabled with the offset base assembly of the present invention would fall over the precipice, possibly falling some distance before striking another surface and thereby damaging the router. The present invention may further increase the quality of work product produced by allowing the user to maintain focus on the work piece and not be distracted by any competing interests, i.e., keeping the router from falling off of an edge, corner, or precipice.

It is believed that the offset base router of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An offset base router, comprising:

a motor assembly for providing a driving force in a substantially horizontal axis;

a gear assembly coupled to the motor assembly for translating the substantially horizontal driving force of the motor assembly into a substantially vertical driving force along an arbor assembly, the arbor assembly suitable for receiving a bit; and an offset base assembly coupled to the gear assembly for resting on a work piece and providing access by the bit to the work piece, wherein the offset base assembly provides a center of gravity proximally located about the coupling point of the motor assembly to the gear assembly.

2. The offset base router of claim 1, wherein the offset base assembly is coupled to the gear assembly by a height adjustment assembly for adjusting the height of the gear assembly relative to the offset base assembly.

3. The offset base router of claim 2, wherein the height adjustment assembly comprises:

a gear casing forming part of the gear assembly;

at least one rack post connected to the base and received within the gear casing;

a pinion including a first end and a second end, said pinion engaging the rack post for allowing vertical movement of said pinion; and a height adjustment knob connected to the first end of the pinion for moving the pinion relative to the at least one rack post.

4. The offset base router of claim 3, wherein the height adjustment assembly includes more than one rack post.

5. The offset base router of claim 3, wherein the at least one rack post is a hollow rack post with a spring connected to the base and operably engaging the gear casing.

6. The offset base router of claim 5, wherein the spring is at least one of a compression spring and a constant tension spring.

7. The offset base router of claim 3, wherein the height adjustment assembly further includes a clamping assembly comprising:

at least one clamp spacer disposed on the pinion, and a lock knob connected to the second end of the pinion for locking the position of the pinion by engaging an end of the clamp spacer against the at least one rack post and the pinion.

8. The offset base router of claim 7, wherein the clamping assembly further comprises two or more of the clamp spacers disposed on the pinion.

9. The offset base router of claim 1, wherein the offset base assembly further comprises a base including an aperture coupled to a sub-base including an aperture.

10. The offset base router of claim 9, wherein the offset base assembly is enabled to attach a template guide.

11. The offset base router of claim 9, wherein the base assembly further comprises a sub-base adjustment assembly, which allows the user to adjust the sub-base relative to the base.

12. The offset base router of claim 9, wherein the sub-base is a clear sub-base for providing improved visibility of a work surface to a user of the offset base router.

13. The offset base router of claim 9, wherein the sub-base further comprises at least two apertures.

14. The offset base router of claim 9, wherein the sub-base is removable from the base.

15. The offset base router of claim 9, wherein the offset base assembly further comprises a dust and debris collection portal.

16. The offset base router of claim 15, wherein the dust and debris collection portal is connected to a dust collection system.

17. The offset base router of claim 1, further comprising a wire guard connected to the gear assembly for preventing user contact with the arbor assembly and the bit while in operation.

18. The offset base router of claim 17, wherein the wire guard is composed of at least one of a plastic and a metal.

19. The offset base router of claim 1, further comprising a removable handle which attaches to the gear assembly.

20. The offset base router of claim 1, wherein the motor assembly of the offset base router receives power through a power cord.

21. An offset base router, comprising:

a motor assembly for providing a driving force in a substantially horizontal axis;

a gear assembly coupled to the motor assembly for translating the substantially horizontal driving force of the motor assembly into a substantially vertical driving force along an arbor assembly, the arbor assembly suitable for receiving a bit; and an offset base assembly coupled to the gear assembly, the offset base assembly being suitable for resting on a work piece and providing access by the bit to the work piece, and a height adjustment assembly coupled to the offset base assembly and the gear assembly for providing vertical adjustment capabilities, wherein the height adjustment assembly enables the adjustment of the height of the gear assembly relative to the offset base assembly, and wherein the offset base assembly provides a center of gravity proximally located about the coupling point of the motor assembly to the gear assembly.

22. The offset base router of claim 21, wherein the height adjustment assembly further comprises:

a gear casing forming part of the gear assembly;

a first hollow rack post including a first compression spring, connected to the base and received within the gear casing of the gear assembly, a second hollow rack post including a second compression spring, connected to the base and received within the gear casing of the gear assembly;

a pinion including a first end and a second, said pinion engaging both the first and the second hollow rack posts for allowing vertical movement of said pinion; and a height adjustment knob connected to the first end of the pinion for moving the pinion relative to the first and the second hollow rack posts.

23. The offset base router of claim 22, wherein the height adjustment assembly further includes a clamping assembly comprising:

a first clamp spacer located at the first end of the pinion;

a second clamp spacer located at the second end of the pinion; and a lock knob connected to the second end of the pinion for locking the position of the pinion by engaging an end of each of the first and second clamp spacers against the first and second hollow rack posts, the gear casing of the gear assembly, and the pinion.

24. The offset base router of claim 21, wherein the offset base assembly further comprises a base including an aperture coupled to a sub-base including an aperture.

25. The offset base router of claim 24, wherein the offset base assembly is enabled to attach a template guide.

26. The offset base router of claim 24, wherein the base assembly further comprises a sub-base adjustment assembly, which allows the user to adjust the sub-base relative to the base.

27. The offset base router of claim 24, wherein the sub-base is a clear sub-base for providing improved visibility of a work surface to a user of the offset base router.

28. The offset base router of claim 24, wherein the sub-base further comprises at least two apertures.

29. The offset base router of claim 24, wherein the sub-base is removable from the base.

30. The offset base router of claim 25, wherein the offset base assembly further comprises a dust and debris collection portal.

31. The offset base router of claim 30, wherein the dust and debris collection portal is connected to a dust collection system.

32. The offset base router of claim 21, further comprising a wire guard connected to the gear assembly for preventing user contact with the arbor assembly and the bit while in operation.

33. The offset base router of claim 32, wherein the wire guard is composed of at least one of a plastic and a metal.

34. The offset base router of claim 21, further comprising a removable handle which attaches to the gear assembly.

35. The offset base router of claim 21, wherein the motor assembly of the offset base router receives power through a power cord.

36. An offset base router, comprising:

means for engaging a bit;

means for driving the bit connected to the means for engaging the bit;

means for providing an offset center of gravity that is located proximal the connection between the means for engaging the bit and the means for driving the bit, said means for providing an offset center of gravity coupled to the means for engaging the bit.

37. The offset base router of claim 36, wherein the means for driving the bit further comprises:

a motor assembly for providing a driving force in a substantially horizontal axis; and a gear assembly coupled to the motor assembly for translating the substantially horizontal driving force of the motor assembly into a substantially vertical driving force along an arbor assembly of the means for engaging the bit, the arbor assembly suitable for receiving the bit.

38. The offset base router of claim 37, wherein the means for providing an offset center of gravity includes an offset base assembly coupled to the gear assembly, the offset base assembly being suitable for providing a center of gravity proximally located about the coupling point of the motor assembly to the gear assembly, providing access by the bit to a work piece, and for attaching a template guide.

39. The offset base router of claim 38 wherein the offset base assembly further comprises a base including an aperture and a sub-base including an aperture.

40. The offset base router of claim 39, wherein the offset base assembly is enabled to attach a template guide.

41. The offset base router of claim 39, wherein the base further comprises a sub-base adjustment mechanism, which allows the user to offset the sub-base relative to the base.

42. The offset base router of claim 39, wherein the sub-base is a clear sub-base for providing improved visibility of a work surface to a user of the offset base router.

43. The offset base router of claim 39, wherein the sub-base further comprises at least two apertures.

44. The offset base router of claim 39, wherein the sub-base is removable from the base.

45. The offset base router of claim 39, wherein the offset base assembly further comprises a dust and debris collection portal.

46. The offset base router of claim 14, wherein the dust and debris collection portal is connected to a dust collection system.

47. The offset base router of claim 46, wherein the wire guard is composed of at least one of a plastic and a metal.

48. The offset base router of claim 36, further comprising a wire guard connected to the gear assembly for preventing user contact with the arbor assembly and the bit while in operation.

49. The offset base router of claim 36, wherein the offset base router further includes a height adjustment assembly, comprising:

a gear casing forming part of the gear assembly;

a first hollow rack post including a first compression spring, connected to the base and received within the gear casing of the gear assembly;

a second hollow rack post including a second compression spring, connected to the base and received within the gear casing of the gear assembly;

a pinion including a first end and a second, engaging both the first and the second hollow rack posts for allowing vertical movement of the pinion; and a height adjustment knob connected to the first end of the pinion for moving the pinion relative to the first and the second hollow rack posts.

50. The offset base router of claim 49, wherein the height adjustment assembly further includes a clamping assembly comprising:

a first clamp spacer located at the first end of the pinion;

a second clamp spacer located at the second end of the pinion; and a lock knob connected to the second end of the pinion for locking the position of the pinion by engaging an end of each of the first and second clamp spacers against the first and second hollow rack posts, the gear casing of the gear assembly, and the pinion.

51. The offset base router of claim 36, further comprising a removable handle which attaches to the gear assembly.

52. The offset base router of claim 36, wherein the motor assembly of the offset base router receives power through a power cord.

* * * * *